United States Patent
Ross, Jr. et al.

(10) Patent No.: US 7,963,164 B2
(45) Date of Patent: Jun. 21, 2011

(54) CAPACITIVE SENSOR ASSEMBLY FOR DETERMINING LEVEL OF FLUENT MATERIALS

(75) Inventors: Herbert G. Ross, Jr., Argyle, TX (US); Gagik Farmanyan, Plano, TX (US)

(73) Assignee: Rochester Gauges, Inc., Dallas, TX (US)

( * ) Notice: Subject to any disclaimer, the term of this patent is extended or adjusted under 35 U.S.C. 154(b) by 346 days.

(21) Appl. No.: 12/135,392

(22) Filed: Jun. 9, 2008

(65) Prior Publication Data
US 2009/0301189 A1 Dec. 10, 2009

(51) Int. Cl.
*G01F 23/26* (2006.01)
(52) U.S. Cl. .......... 73/304 C; 73/290 B; 73/290 R; 73/304 R
(58) Field of Classification Search .......... 73/290 B, 73/290 R, 290 V, 304 C, 304 R
See application file for complete search history.

(56) References Cited

U.S. PATENT DOCUMENTS

| | | | | |
|---|---|---|---|---|
| 2,354,945 | A | * | 8/1944 | Cohen et al. ............... 73/304 C |
| 2,955,466 | A | | 10/1960 | Coles |
| 3,277,711 | A | | 10/1966 | Roberge |
| 3,343,415 | A | * | 9/1967 | Johnston ................ 73/304 C |
| 3,862,571 | A | * | 1/1975 | Vogel ..................... 73/304 C |
| 3,864,974 | A | | 2/1975 | Rauchwerger |
| 3,901,079 | A | * | 8/1975 | Vogel ..................... 73/304 C |
| 3,935,970 | A | | 2/1976 | Spaw |
| 3,939,360 | A | * | 2/1976 | Jackson ................... 307/118 |
| 3,991,614 | A | * | 11/1976 | Ditzler .................... 73/215 |
| 4,122,718 | A | * | 10/1978 | Gustafson ............... 73/304 C |
| 4,142,415 | A | * | 3/1979 | Jung et al. .............. 73/304 C |
| 4,184,369 | A | * | 1/1980 | Jung et al. .............. 73/304 C |
| 4,201,085 | A | | 5/1980 | Larson |
| 4,226,118 | A | | 10/1980 | Aldrich |
| 4,567,762 | A | * | 2/1986 | Hopper et al. .......... 73/304 R |
| 4,589,281 | A | | 5/1986 | Aldrich |
| 4,720,997 | A | * | 1/1988 | Doak et al. .................. 73/295 |
| 4,845,986 | A | * | 7/1989 | Hayashi et al. .......... 73/290 R |
| 5,400,651 | A | | 3/1995 | Welch |
| 5,424,649 | A | | 6/1995 | Gluck et al. |
| 5,477,727 | A | * | 12/1995 | Koga ...................... 73/304 C |
| 5,481,197 | A | * | 1/1996 | Sanders et al. ............. 324/690 |
| 6,101,873 | A | * | 8/2000 | Kawakatsu et al. ...... 73/304 C |
| 6,138,508 | A | * | 10/2000 | Hannan et al. .......... 73/304 C |

(Continued)

FOREIGN PATENT DOCUMENTS

DE 3137153 A1 * 4/1983

*Primary Examiner* — David A. Rogers
(74) *Attorney, Agent, or Firm* — Alvin R. Wirthlin

(57) ABSTRACT

A capacitive sensor assembly for measuring a level of fluent material in a container includes an electronics section for receiving and processing signals and an antenna probe operably associated with the electronics section. The antenna probe has an electrical conductor and an insulating layer that covers at least a portion of the electrical conductor. The electrical conductor is connected to the electronics section. An enlarged measurement portion is in turn connected to the electrical conductor for detecting the presence or absence of the fluent material. The enlarged measurement portion has a surface area that is larger than a surface area of the electrical conductor over an equivalent height or length to function as a first plate of the capacitive sensor assembly, with the fluent material to be measured functioning as a second capacitive plate. In this manner, a change in detected capacitance of the antenna probe is reflective of a level condition of the fluent material.

20 Claims, 9 Drawing Sheets

U.S. PATENT DOCUMENTS

| | | | |
|---|---|---|---|
| 6,539,797 B2 * | 4/2003 | Livingston et al. | 73/304 C |
| 6,677,891 B2 | 1/2004 | Fehrenbach et al. | |
| 6,761,067 B1 * | 7/2004 | Capano | 73/304 C |
| 6,842,018 B2 | 1/2005 | McIntosh | |
| 6,857,313 B2 | 2/2005 | Williamson | |
| 6,904,789 B2 | 6/2005 | Campbell et al. | |
| 6,938,479 B2 | 9/2005 | Carpenter et al. | |
| 7,062,965 B2 * | 6/2006 | Immel | 73/295 |
| 7,114,391 B2 | 10/2006 | Sasaki et al. | |
| 7,121,140 B2 * | 10/2006 | Lo | 73/305 |
| 7,127,943 B1 * | 10/2006 | Griffiths et al. | 73/304 C |
| 7,161,361 B2 * | 1/2007 | Qu et al. | 324/690 |
| 7,307,485 B1 | 12/2007 | Snyder et al. | |
| 2001/0000851 A1 * | 5/2001 | Morimoto | 73/304 C |
| 2004/0187570 A1 * | 9/2004 | Williamson | 73/304 C |
| 2005/0039528 A1 * | 2/2005 | Wernet et al. | 73/304 C |
| 2005/0076711 A1 * | 4/2005 | Urquidi | 73/304 C |
| 2006/0021432 A1 * | 2/2006 | Salzmann et al. | 73/304 R |
| 2007/0079653 A1 * | 4/2007 | Zuleta et al. | 73/304 R |
| 2007/0204690 A1 * | 9/2007 | Salzmann et al. | 73/304 R |
| 2007/0240506 A1 * | 10/2007 | Lin | 73/304 R |
| 2009/0031798 A1 * | 2/2009 | Radhakrishnan et al. | 73/304 C |
| 2009/0165552 A1 * | 7/2009 | Sieh et al. | 73/304 C |

* cited by examiner

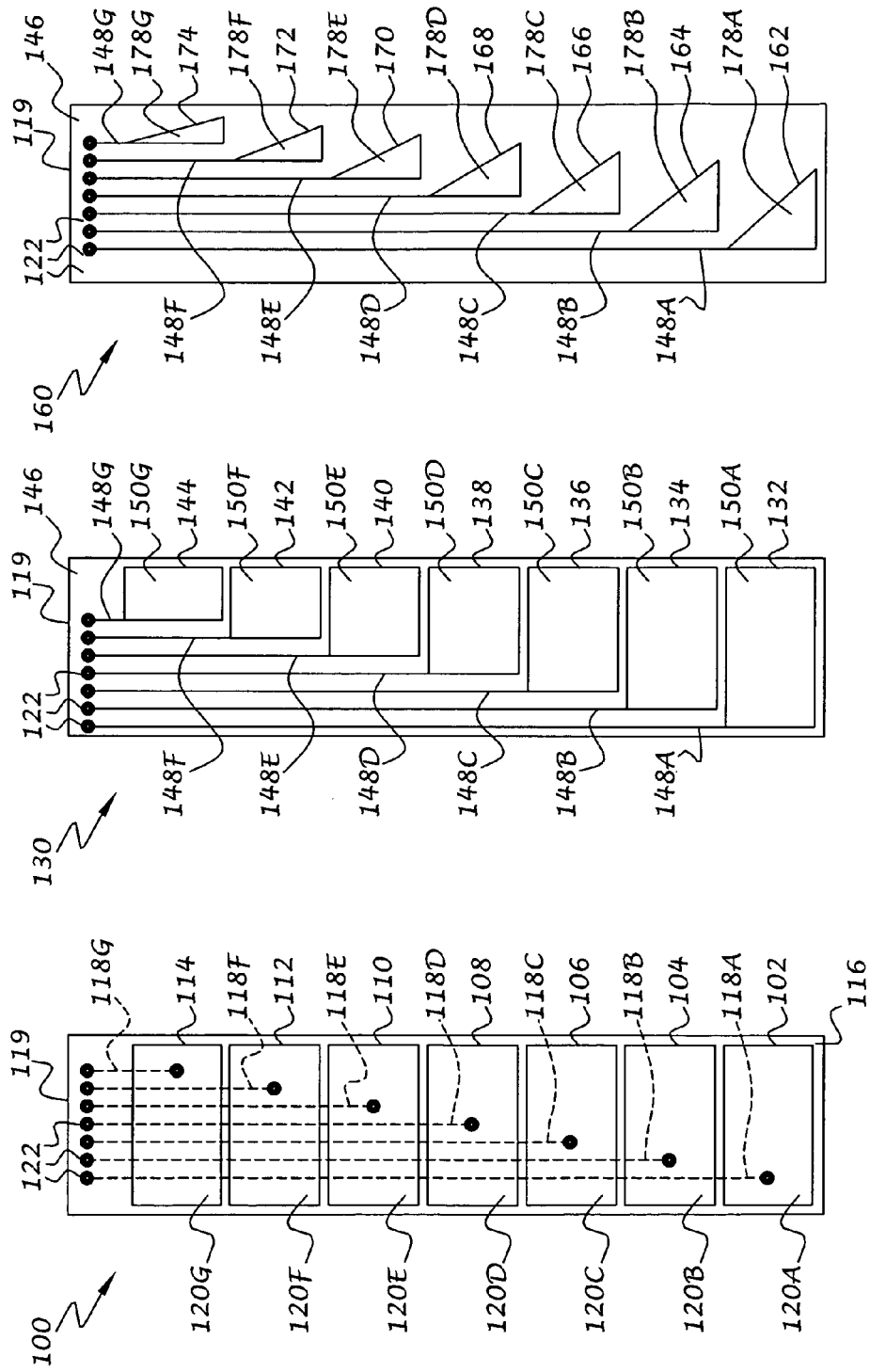

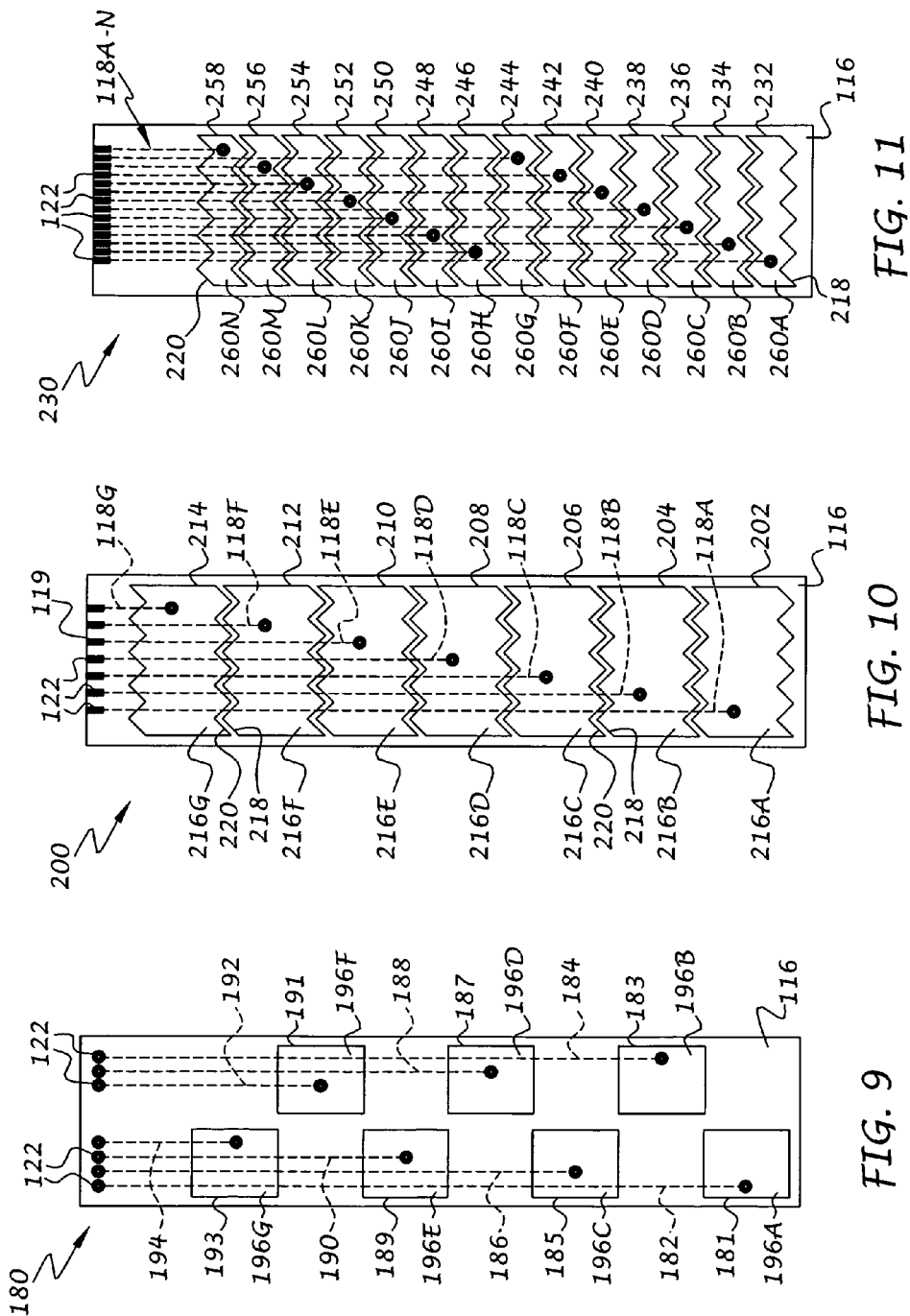

CAPACITIVE SENSOR ASSEMBLY FOR DETERMINING LEVEL OF FLUENT MATERIALS

CROSS REFERENCE TO RELATED APPLICATIONS

This application is related to U.S. application Ser. No. 12/135,359 and U.S. application Ser. No. 12/135,421 filed on even date herewith, the disclosures of which are hereby incorporated by reference.

BACKGROUND OF THE INVENTION

This invention relates to capacitive transducers, and more particularly to variable capacitance transducers for determining the level of fluent materials within a container.

Transducers for determining liquid level are often used in vehicles, industrial equipment and other systems and components. Such transducers typically operate by detecting a change in an electrical property of the transducer which varies in accordance with the liquid level.

By way of example, prior art liquid level sensors, such as fuel sensors for motor vehicles, usually include a float that rides on an upper surface of the fuel in a fuel tank. The float is typically connected to one end of a pivot arm while the other end of the pivot arm typically includes a wiper mechanism that brushes against a resistor strip when the arm is rotated due to a change in fuel level in the tank. Such sensors are prone to wear, mechanical and/or electrical breakdown or inaccurate liquid level detection. Although variable capacitance probes have been developed to overcome these drawbacks, they are cost-prohibitive in many applications and are typically limited to measure a certain type of liquid, since different liquids will have different dielectric properties.

In addition, a variable capacitance probe designed to measure fuel level normally cannot be used for measuring water level due to the different dielectric properties associated with different liquids. For example, the dielectric constant at room temperature of a vacuum is one, of air is close to one, of gasoline is about two, of industrial alcohol is anywhere from 16-31, and of water is about 80. Since capacitance is directly dependent on the dielectric constant, a transducer designed for measuring the level of one type of liquid could not be relied upon for measuring other types of liquids. However, even when the transducer is designed for measuring only one type of liquid, such as gasoline, the dielectric constant can change due to different gasoline formulations, the presence of water, alcohol, detergents, additives, as well as environmental factors such as temperature, thus leading to significant measurement inaccuracies. Prior art liquid level switches for detecting a low or high level condition in coolant or oil reservoirs or the like also suffer the same drawbacks.

BRIEF SUMMARY OF THE INVENTION

According to one aspect of the invention, a capacitive sensor assembly for measuring a level of fluent material in a container includes electrical circuitry for receiving and processing signals and an antenna probe operably associated with the electrical circuitry. The antenna probe has an electrical conductor and an insulating layer that covers at least a portion of the electrical conductor. The electrical conductor is connected to the electrical circuitry and an enlarged measurement portion is connected to the electrical conductor for detecting the presence or absence of the fluent material. The enlarged measurement portion has a surface area that is larger than a surface area of the electrical conductor over the same height to function as a first plate of the capacitive sensor assembly, with the fluent material to be measured functioning as a second capacitive plate. In this manner, a change in detected capacitance of the antenna probe is reflective of a level condition of the fluent material.

BRIEF DESCRIPTION OF THE DRAWINGS

The foregoing summary as well as the following detailed description of the preferred embodiments of the present invention will be best understood when considered in conjunction with the accompanying drawings, wherein like designations denote like elements throughout the drawings, and wherein:

FIG. 6 is a front elevational view of a probe section in accordance with another embodiment of the invention;

FIG. 7 is a front elevational view of a probe section in accordance with a yet another embodiment of the invention;

FIG. 8 is a front elevational view of a probe section in accordance with a further embodiment of the invention;

FIG. 9 is a front elevational view of a probe section in accordance with yet a further embodiment of the invention;

FIG. 10 is a front elevational view of a probe section in accordance with another embodiment of the invention;

FIG. 11 is a front elevational view of a probe section in accordance with an additional embodiment of the invention;

It is noted that the drawings are intended to depict only typical embodiments of the invention and therefore should not be considered as limiting the scope thereof. It is further noted that the drawings are not necessarily to scale. The invention will now be described in greater detail with reference to the accompanying drawings.

DETAILED DESCRIPTION OF THE INVENTION

Figures 1, 2:
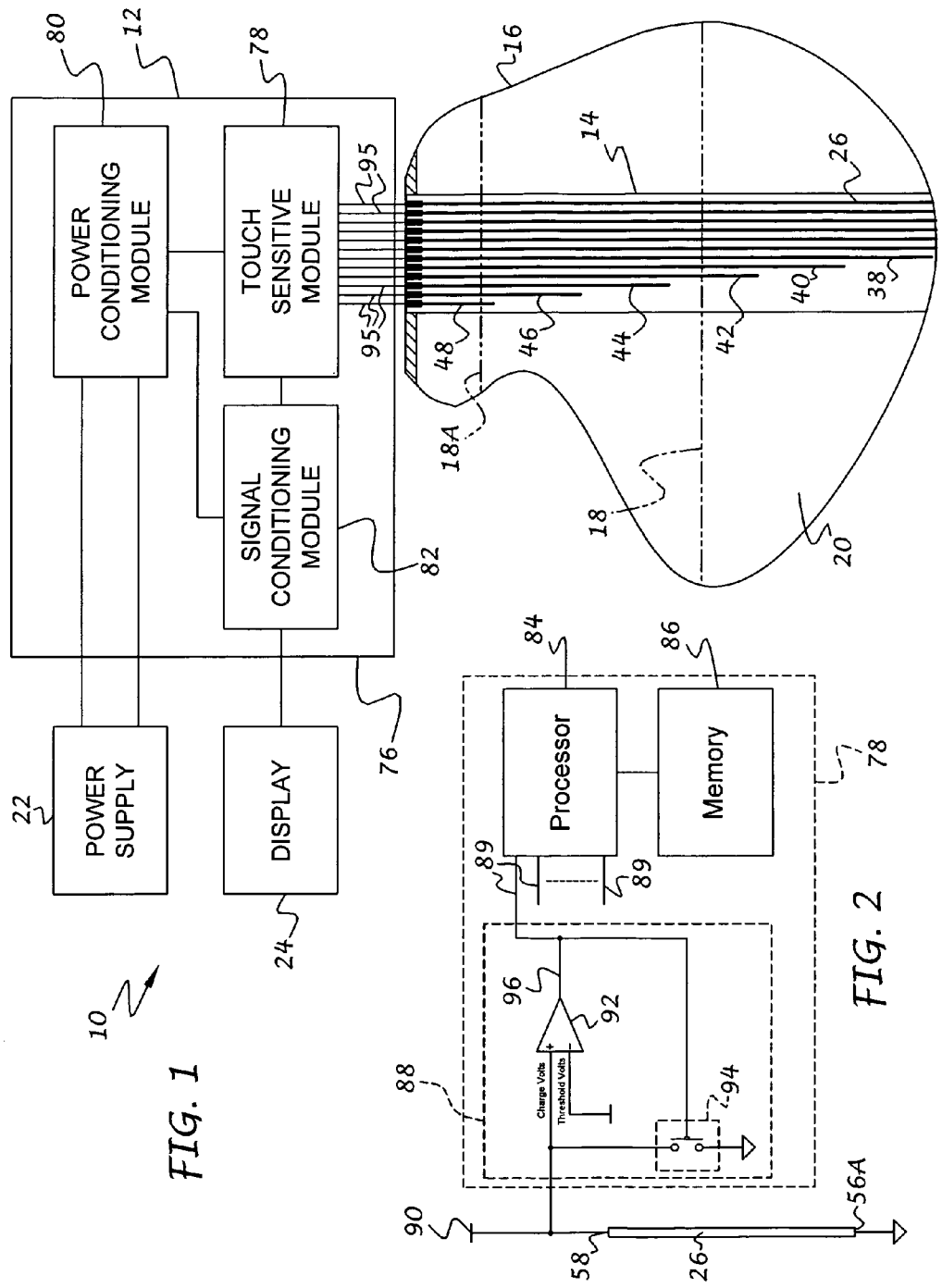
FIG. 1 is a schematic diagram illustrating a capacitive transducer in accordance with the present invention operably associated with a tank or other container.
FIG. 2 is a schematic view of a portion of a touch sensitive module that forms part of the capacitive transducer of FIG. 1.

Referring to the drawings, and to FIG. 1 in particular, a capacitive transducer 10 in accordance with an exemplary embodiment of the present invention is illustrated. The capacitive transducer 10 preferably includes an electronics section 12 and a probe section 14 that electrically interfaces with the electronics section. The probe section 14 is adapted for mounting inside or outside a tank 16, vessel or other container for measuring a level, as denoted by numerals 18 and 18A, of a fluent material 20 within the container. The electronics section 12 is preferably powered by an external power supply 22 and sends appropriate signals to an external display 24 or other interface, such as control circuitry (not shown) for controlling inflow and outflow of material, upon determination of material level within the container. The fluent material 20 to be measured can be in the form of liquid or granular materials. Practical applications of this invention include, but are not limited to, the measurement of water, fuel, oil, coolant, and other liquid levels in motorized vehicles and stationary equipment and systems, the measurement of granular materials within storage bins, and so on.

Figure 3:
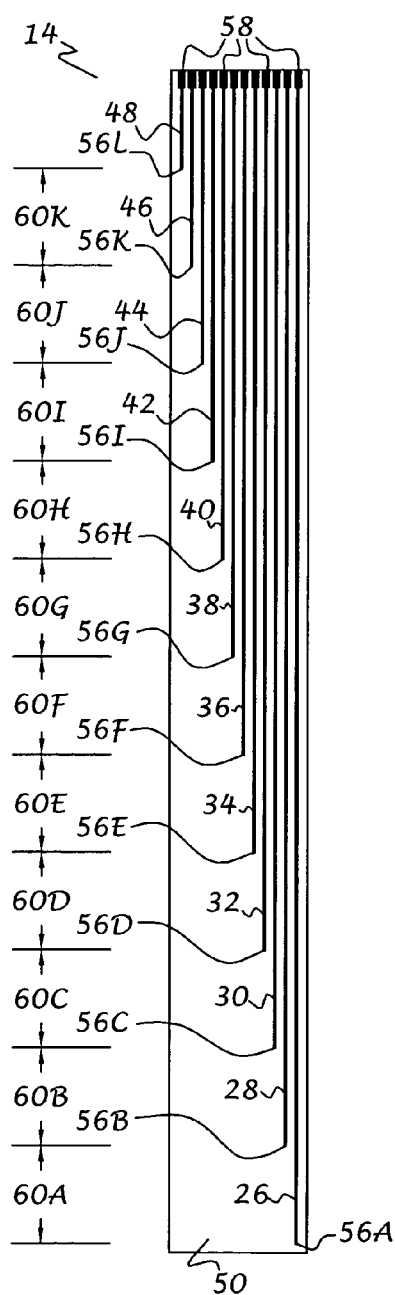
FIG. 3 is a front elevational view of a probe section of the capacitive transducer in accordance with one exemplary embodiment of the invention.
Figure 4:
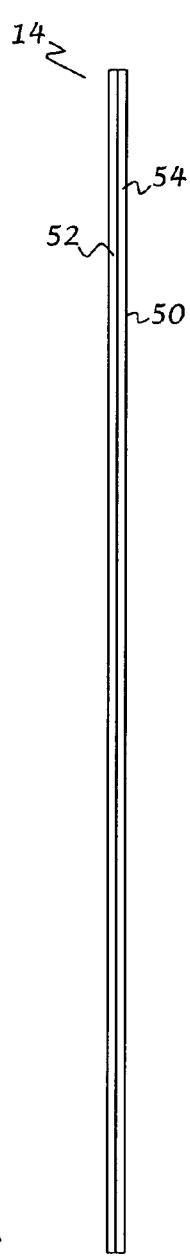
FIG. 4 is a side elevational view of the probe section.

Referring now to FIGS. 3 and 4, the probe section 14 in accordance with an exemplary embodiment of the invention preferably includes a primary antenna probe 26 and a plurality of secondary antenna probes 28, 30, 32, 34, 36, 38, 40, 42, 44, 46, and 48 formed as elongate electrically conductive electrodes or traces on an elongate electrically insulating substrate 50. The primary probe 26 is preferably constantly immersed in the material being measured while the secondary probes are used to dynamically calibrate the primary probe 26 during measurement, as will be described in greater detail below. Depending on the type of sensing application, the substrate may be a stiff or flexible printed circuit board (PCB) and the traces 26 28, 30, 32, 34, 36, 38, 40, 42, 44, 46, and 48 may be formed between layers 52, 54 of the PCB using well-known techniques.

Each trace 26, 28, 30, 32, 34, 36, 38, 40, 42, 44, 46, and 48 has a distal tip portion 56A-56L, respectively, and a proximal connection portion 58 for electrical connection to the electronics section 12. Preferably, the traces are of diminishing length from the first trace 26 to the last trace 48 to thereby form a first space or distance 60A between the tips 56A and 56B of the traces 26 and 28; a second space 60B between the tips 56B and 56C of the traces 28 and 30; a third space 60C between the tips 56C and 56D of the traces 30 and 32; a fourth space 60D between the tips 56D and 56E of the traces 32 and 34; a fifth space 60E between the tips 56E and 56F of the traces 34 and 36; a sixth space 60F between the tips 56F and 56G of the traces 36 and 38; a seventh space 60G between the tips 56G and 56H of the traces 38 and 40; an eighth space 60H between the tips 56H and 56I of the traces 40 and 42; a ninth space 60I between the tips 56I and 56J of the traces 42 and 44; a tenth space 60J between the tips 56J and 56K of the traces 44 and 46; and an eleventh space 60K between the tips 56K and 56L of the traces 46 and 48. The spaces 60A-60K are preferably of equal dimension to facilitate level determination. However, it will be understood that the spaces may have different dimensions.

It will be further understood that the provision of twelve traces is by way of example only since more or less antenna probes may be provided. For example, when the type of flowable material to be measured is known and does not change in material properties, and when environmental factors affecting the accuracy of the measurement are known, such as temperature and humidity, it may be possible to use a single antenna probe for accurate level determination with environmental factors being resolved by the electronics section 12. In accordance with the present invention, a single antenna probe may be formed on a stiff or flexible PCB or be embodied as an insulated electrical wire that connects to the electronics section 12 or any other electrically conductive material with an insulative sheath.

When the material to be measured is unknown, or when a known material undergoes unknown or unanticipated property changes, the provision of two or more antenna probes is preferable, with accuracy of measurement increasing proportionately with the number of antenna probes provided. By way of example only, when the capacitive transducer 10 of the present invention is installed in a fuel tank of a motor vehicle, it would be very difficult to anticipate the type of fuel that would be in the tank because of variations in dielectric constant and density which are affected by temperature, humidity, pressure, fuel formulations, additives, and octane levels from different manufacturers. In addition, the operator may choose to add other substances to the fuel tank in an attempt to increase fuel economy, boost octane level, and/or reduce the presence of moisture within the tank. Similar uncertainties may also be encountered when measuring the coolant level, oil level, as well as other fluid levels of a motor vehicle, stationary equipment and other systems and components where the measurement of liquid level is desirous.

It will be understood that the present invention is not limited to the particular arrangement shown and described but includes other arrangements such as traces formed on a single layer PCB or multiple traces formed on different layers of a multi-layer PCB to increase the trace density and reduce the probe section footprint. In accordance with a further embodiment of the invention, the probe section 14 may be constructed of one or more solid or stranded conductive wires surrounded by one or more insulating layers. Where a plurality of antenna probes are used, the antenna probes may be embodied as an electrical cable having a plurality of electrically isolated conductive wires.

Figure 5:
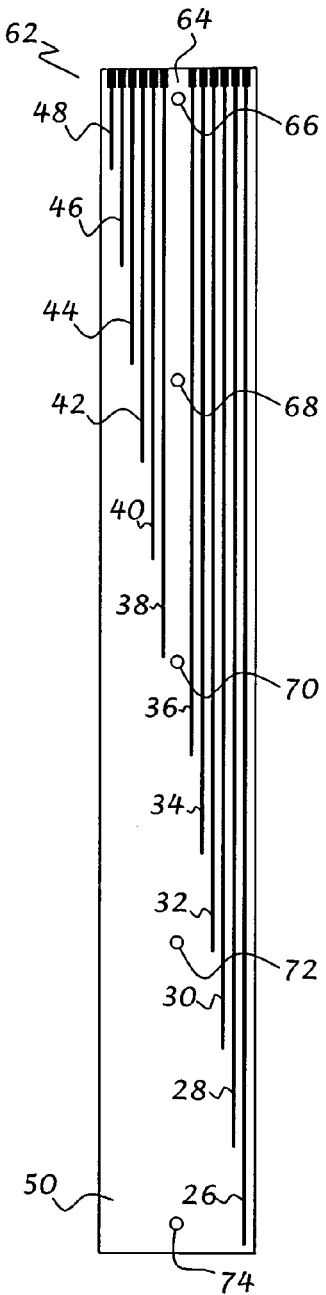
FIG. 5 is a front elevational view of a probe section in accordance with a further embodiment of the invention.

Referring to FIG. 5, a probe section 62 in accordance with a further embodiment of the invention is illustrated. The probe section 62 is similar in construction to the probe section 14 previously described, with the exception that a gap 64 is located between the antenna probes 36 and 38. A series of holes 66, 68, 70, 72, and 74 are formed in the substrate 50 for receiving fasteners (not shown) such as rivets, screws, bolts or the like for mounting the probe section 62 to a frame (not shown) or other support. It will be understood that other mounting arrangements can be used for installing the probe section 62 within a tank or the like.

Referring again to FIG. 1, the electronics section 12 preferably includes a PCB 76 with a touch-sensitive module 78 connected to the antenna probes 26-48 of the probe section 14 via I/O ports 95, a power conditioning module 80 that interfaces between the power supply 22 and the touch-sensitive module 80, and a signal conditioning module 82 that interfaces between the display/control circuitry 24 and the touch-sensitive module 78. The power conditioning module 78 can include various electronic components (not shown) in a well-known manner to regulate power from the power supply 22 and meet requirements of original equipment manufacturers (OEM's) to filter noise, spikes and other electrical anomalies that may negatively affect operation of the electronics section 12. It will be understood that the power conditioning module 80 can be eliminated and/or replaced with appropriate electronics in the touch-sensitive module 78 depending on the particular measurement application and features of the touch-sensitive module.

The signal conditioning module 82 can include electrical components (not shown) for interfacing with the display 24 in a well-known manner and/or control circuitry for operating a pump, alarm, and so on. The signal conditioning module is of well-known construction and therefore will not be further described.

As shown in FIG. 2, the touch-sensitive module 78 is preferably embodied as a programmable System-on-Chip (SoC) device that is normally associated with capacitive-type touch sensitive devices, such as touch-screens and touch-controls, for detecting movement and/or position of a finger or stylus. Such chips are currently used for touch sensitive displays and controls associated with phones, personal digital assistants (PDA's), portable music players, and the like. Due to popularity and the sheer numbers of these chips available from various manufacturers, they are very cost-effective when compared to other systems having individual components. This is especially important in the transportation industry where there has been a long-felt need for low-cost, liquid level sensors that deliver accurate readings independent of liquid type and environmental factors.

The SoC device preferably includes a chip with I/O ports 95, an integrated processor 84, memory 86 connected to the processor, and a plurality of oscillator circuits 88 (only one shown) connected between different ports 89 of the processor and the I/O ports 95, which are in turn connected to the antenna probes 26-48. Preferably, the number of oscillator circuits 88 is equal to or greater than the number of antenna probes being monitored. Each oscillator circuit 88 is multiplexed by the processor 84 so that a separate measurement can be determined for each antenna probe without interference from the other antenna probes. The memory 86 preferably includes both volatile memory, such as RAM, and non-volatile memory, such as EEPROM, for programming functions and data storage.

Each oscillator circuit 88 is identical in construction and therefore will be described as it applies to the antenna probe 26, it being understood that identical circuits would also be associated with the remaining antenna probes. The oscillator circuit 88 is preferably in the form of a relaxation oscillator that includes a charging current source 90 and a comparator 92 with a reset switch 94. The comparator 92 has two analog voltage inputs (labeled positive and negative) and a single digital output 96 having on and off states. The internal chip power, the comparator's positive input and an I/O port 95 (FIG. 1) of the module 78 are connected to the positive end of the charging capacitor, in this case the connection end 58 of the antenna probe 26. Only internal chip power is connected to the comparator's negative input, thus providing a threshold voltage for comparison purposes. The reset switch 94, which may be in the form of an embedded FET or other switching device, temporarily connects the positive end 58 of the charged antenna probe 26 to ground when actuated to ensure complete discharge of the antenna probe 26 prior to each charging cycle. With these components in place, the electronics section 12 is ready to begin reading and evaluating the external capacitive antenna probes attached to each of its input pins. Again, although twelve antenna probes are shown, it will be understood that more or less probes and input pins may be provided. It will be further understood that a single oscillator circuit can be provided for a plurality of probes instead of plurality of oscillator circuits. With this embodiment, a multiplexer or the like can be used to sequentially obtain the probe readings through the single oscillator circuit.

More information on a suitable programmable SoC device can be found in U.S. Pat. No. 7,307,485 issued to Snyder et al., the disclosure of which is hereby incorporated by reference. Suitable touch-sensitive modules 78 are currently available from Cypress Semiconductor Corp. of San Jose, Calif. under the CY8C21 series of programmable SoC devices as well as from Texas Instruments of Dallas, Tex. and other manufacturers.

It will be understood that the touch-sensitive module 78 need not be entirely embedded in a chip but may include separate electrical components and/or systems that could be used for detecting a change in electrical properties of the antenna probe(s) as the liquid or other material being measured travels up and down the probe.

In operation, and again only referring to the antenna probe 26, when a measuring cycle is initiated on the chip's port 95 that connects with the positive end 58 of the antenna probe 26, the reset switch 94 is first closed to deplete any charges remaining on the antenna probe. Once depleted, the reset switch 94 is opened to commence charging of the antenna probe 26. As the antenna probe charges, the voltage on its positive input steadily approaches the threshold voltage on the comparator's negative input. When the charge voltage of the antenna probe 26 reaches the preset threshold voltage, the output 96 of the comparator 92 turns on the reset switch 94 to thereby close the circuit and discharge the antenna probe 26 to ground, causing the charging cycle to start over again. The antenna probe functions as one side of a capacitor plate of the relaxation oscillator which has a fixed physical area. Since the substrate insulates the internal plate (antenna) of the capacitor, the surrounding fluent material becomes the other plate of the capacitor. As the fluent material travels up the probe, the area of the oscillator's second (fluent) plate increases proportionally. In turn, the value of the capacitance or the oscillator changes which can be quantified by reading the resulting changes in the frequency of the relaxation oscillator. The varying frequency is converted to increasing or decreasing counts depending on the fluid rising or falling along the length of the probe antenna. For example, the rate of the capacitance charge/discharge is greater at the material level 18A (FIG. 1) than at the level 18. Consequently, the rate of capacitive charge and discharge can be translated into counts per scan of the antenna probe. By analyzing these counts in the processor 84, the particular capacitive state of the antenna probe 26, and thus the material level, can be accurately determined.

A method for measuring liquid level is preferably embodied as a software program in the memory 86 of the touch-sensitive module 78 for providing various instructions to the processor 84. In general, the method preferably includes the steps of: 1) pre-calibrating the capacitive transducer 10 prior to immersion in a material to be measured; 2) reading the current probe values into memory; 3) determining the material level based on the currently stored probe values and the pre-calibrated probe values; 4) performing a dynamic calibration after each reading to compensate for material type, resonance, temperature and so on; and 5) repeating steps 2) through 4).

Referring now to FIG. 6, an antenna probe section 100 in accordance with a further exemplary embodiment of the invention is illustrated. The antenna probe section 100 is preferably operated as a liquid level switch with one or more discrete level conditions that can be measured with the above-described electronics section 12 or other circuitry capable of detecting variations in capacitance of the probe section 100 and translating that detection into a discrete level condition of the fluid being measured.

As shown, the probe section 100 preferably includes a plurality of antenna probes 102, 104, 106, 108, 110, 112, and 114 formed on an elongate electrically insulating substrate 116. Each antenna probe preferably extends from a position at least proximal to an upper edge 119 of the substrate 116. Depending on the type of sensing application, the substrate may be a stiff or flexible printed circuit board (PCB) and the antenna probes 102, 104, 106, 108, 110, 112, and 114 may be formed between layers of the PCB using well-known techniques.

Each antenna probe 102, 104, 106, 108, 110, 112, and 114 preferably has a trace portion 118A-118G (shown in hidden line) electrically connected to an enlarged measurement portion 120A-120G, respectively, and a proximal connection portion 122 located at a proximal end of the trace portion. The proximal connection portion 122 is adapted for electrical connection to the electronics section 12 or other electrical circuitry. Each enlarged measurement portion is preferably in the form of an electrically conductive plate 120A-120G that is much greater in size or surface area than its associated trace portion over an equivalent height to ensure a wide measurement bandwidth for a particular level condition without the need to calibrate the capacitive transducer for different liquids or other fluent materials, as well as environmental factors such as temperature, humidity, fluid type, and so on. Since the traces 118A-118G are formed on a different layer or side of the substrate 116, a plated thru-hole can be used to connect each trace to its respective plate. The proximal connection portions can also be in the form of plated thru-holes as shown, or as electrically conductive pads or other well-known termination means. Preferably, the traces are of diminishing length from the first trace 118A to the last trace 118G so that the enlarged measurement portions 120A-120G are positioned at discrete positions along the length of the substrate 116. The spaces between each enlarged measurement portion are preferably of equal dimension to facilitate discrete level determination. However, it will be understood that the spaces may have different dimensions depending on the desired location of one or more switch points. It will be further understood that the provision of seven antenna probes is by way of example only since more or less may be provided.

Each antenna probe is preferably electrically isolated from and functions independently of any other antenna probe, with each probe relying on the presence or absence of fluent material to serve as the second conductive plate. In this manner, the multiple electrically isolated conductor plates can be used for detecting multiple discrete levels (such as empty, ¼, ½, ¾, and full tank conditions), actuating a pump or warning signal when the level of fluent material has reached a predetermined point, and so on.

Referring now to FIG. 7, an antenna probe section 130 in accordance with a further exemplary embodiment of the invention is illustrated. The antenna probe section 130 is somewhat similar to the probe section 100 of the previous embodiment and preferably includes a plurality of antenna probes 132, 134, 136, 138, 140, 142, and 144 formed on an elongate electrically insulating substrate 146. Each antenna probe 132, 134, 136, 138, 140, 142, and 144 preferably has a trace portion 148A-148G electrically connected to a enlarged measurement portion 150A-150G, respectively, and a proximal connection portion 122 located at a proximal end of the trace portion. Each enlarged measurement portion is preferably in the form of an electrically conductive plate 150A-150G that is much greater in size or surface area than its associated trace portion over an equivalent height to ensure a wide signal bandwidth for a particular level condition without the need to calibrate the capacitive transducer for different liquids or other fluent materials. As shown, the plates diminish in surface area from the lower-most plate 150A to the uppermost plate 150G to allow room for the trace portions 148A-148G. In this manner, the trace portions can be formed together with the plates 150A-150G on the same layer or side of the substrate. In addition, the present embodiment is especially advantageous where accurate detection of low liquid level is critical. With the larger surface area at the lower-most position on the probe section 130, the enlarged measurement portion 150A will have greater measurement bandwidth than the remaining enlarged measurement portions.

Referring now to FIG. 8, an antenna probe section 160 in accordance with a further exemplary embodiment of the invention is illustrated. The antenna probe section 160 is somewhat similar to the probe section 130 of the previous embodiment, with the exception that the enlarged measurement portions of each antenna probe 162, 164, 166, 168, 170, 172, and 174 are in the form of triangular plates 178A-178G, respectively. As in the previous embodiments, the trace portions 148A-148G extend from their respective plates to their respective proximal connection portions 122.

Referring now to FIG. 9, an antenna probe section 180 in accordance with a further exemplary embodiment of the invention is illustrated. The antenna probe section 180 is somewhat similar in construction to the probe section 100 previously described, with the exception that the enlarged measurement portions of each antenna probe 181, 183, 185, 187, 189, 191 and 193 are in the form of offset rectangular plates 196A-196G, respectively. As in the previous embodiments, the trace portions 182, 184, 186, 188, 180, 192 and 194 extend from their respective plates to their respective proximal connection portions 122.

Referring now to FIG. 10, an antenna probe section 200 in accordance with a further exemplary embodiment of the invention is illustrated. The antenna probe section 200 is somewhat similar in construction to the probe section 100 previously described, with the exception that the enlarged measurement portions of each antenna probe 202, 204, 206, 208, 210, 212, and 214 are in the form of rectangular plates 216A-216G, respectively, with jagged upper edges 218 and jagged lower edges 220 that are complementary in shape and offset from the jagged upper edges so that some overlapping of the plates occurs without electrical contact between them. As in the previous embodiments, the trace portions 118A-118G extend from their respective plates to their respective proximal connection portions 122.

Referring now to FIG. 11, an antenna probe section 230 in accordance with another exemplary embodiment of the invention is illustrated. The antenna probe section 230 is similar in construction to the probe section 200 previously described, with the exception that the number of antenna probes is doubled. As shown, the antenna probes 232, 234, 236, 238, 240, 242, 244, 246, 248, 250, 252, 254, 256, and 258 include enlarged measurement portions 260A-260N, respectively, with jagged upper edges 218 and jagged lower edges 220 that are complementary in shape and offset from the jagged upper edges so that some overlapping of the plates occurs without electrical contact between them. As in the previous embodiments, the trace portions 118A-118N extend from their respective plates to their respective proximal connection portions 122.

Figure 12:
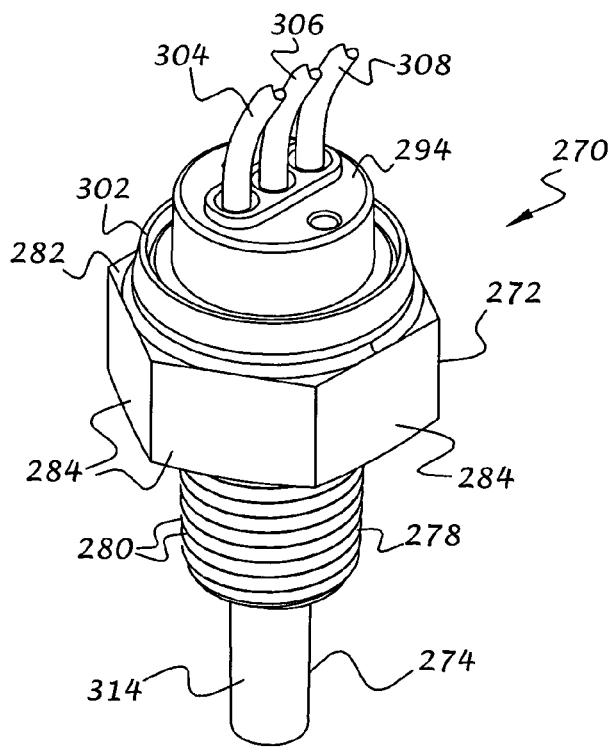
FIG. 12 is top isometric view of a capacitive liquid level sensor assembly in accordance with another embodiment of the invention.
Figure 13:
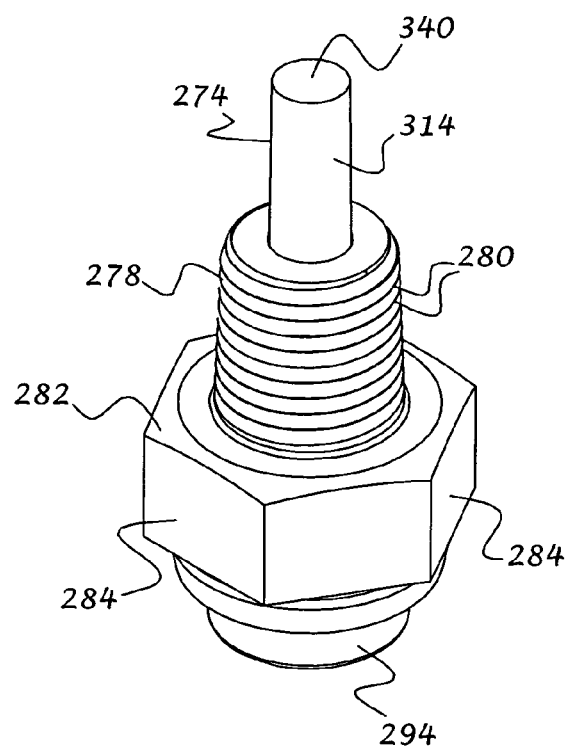
FIG. 13 is a bottom isometric view thereof.

Referring now to FIGS. 12-13, a capacitive liquid level sensor assembly 270 for measuring a discrete liquid level (such as a low level or high level switch point) in accordance with a further embodiment of the invention is illustrated. The sensor assembly 270 preferably includes a mounting head 272 and a capacitive transducer 274 installed within and extending downwardly from the mounting head.

The mounting head 272 is preferably constructed of a metal material, such as brass, but may alternatively be constructed of plastic or other material. The mounting head 272 includes a mounting section 278 with external threads 280 for engagement with internal threads of a reservoir housing (not shown), which may be in the form of a tank, vessel, or other container or the like. The head 272 also preferably includes a securing section 282 with generally flat, external faces 284 for engagement by a wrench or the like (not shown) for installing and removing the liquid level sensor assembly 270 with respect to the reservoir housing in a well-known manner. The particular configuration of the mounting head 272 will largely depend on the mounting arrangement of the reservoir housing. Accordingly, the external threads 280 and external faces 284 may be eliminated and other mounting means may be provided.

Figure 14:
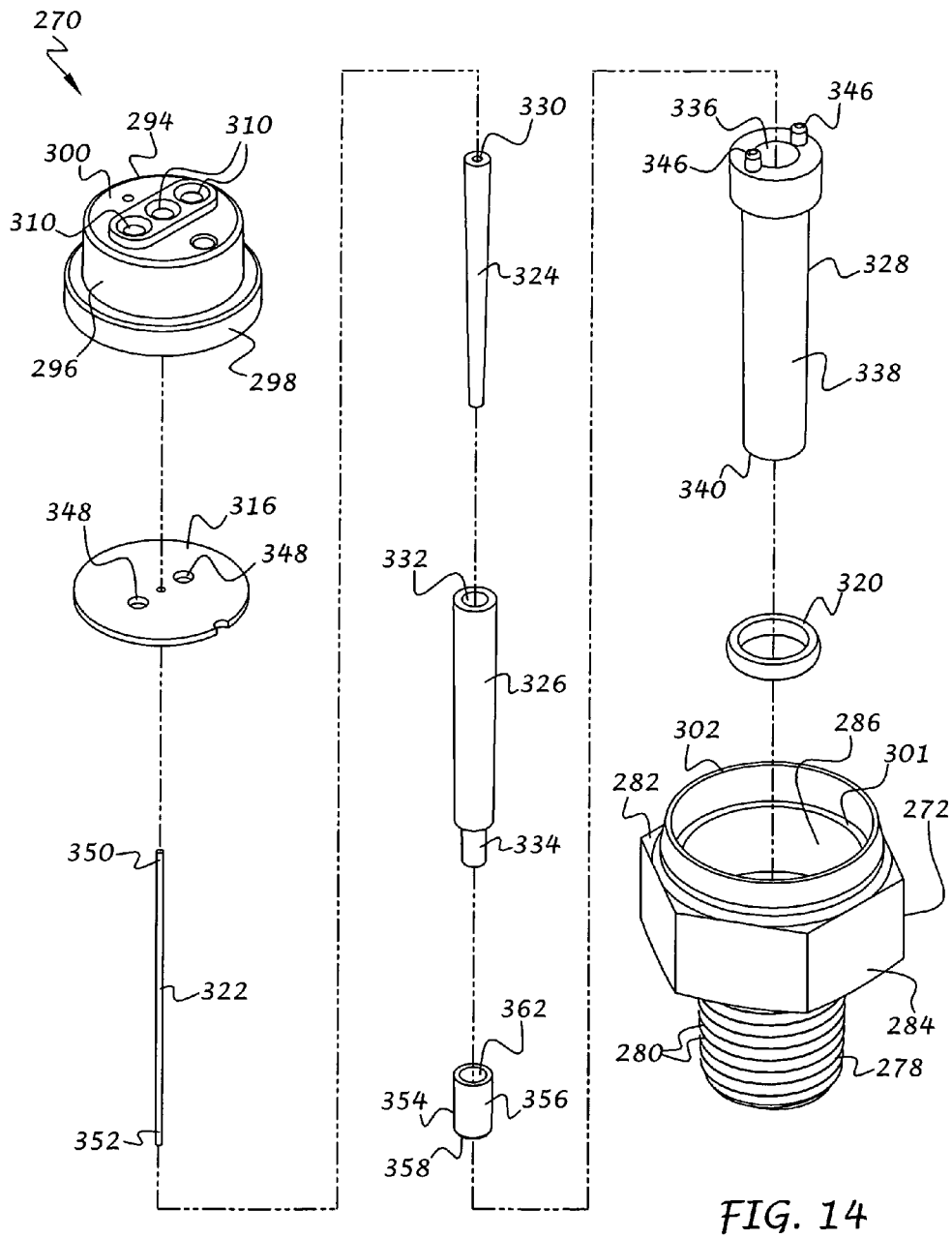
FIG. 14 is a top exploded isometric view of the sensor assembly of FIG. 12.
Figure 15:
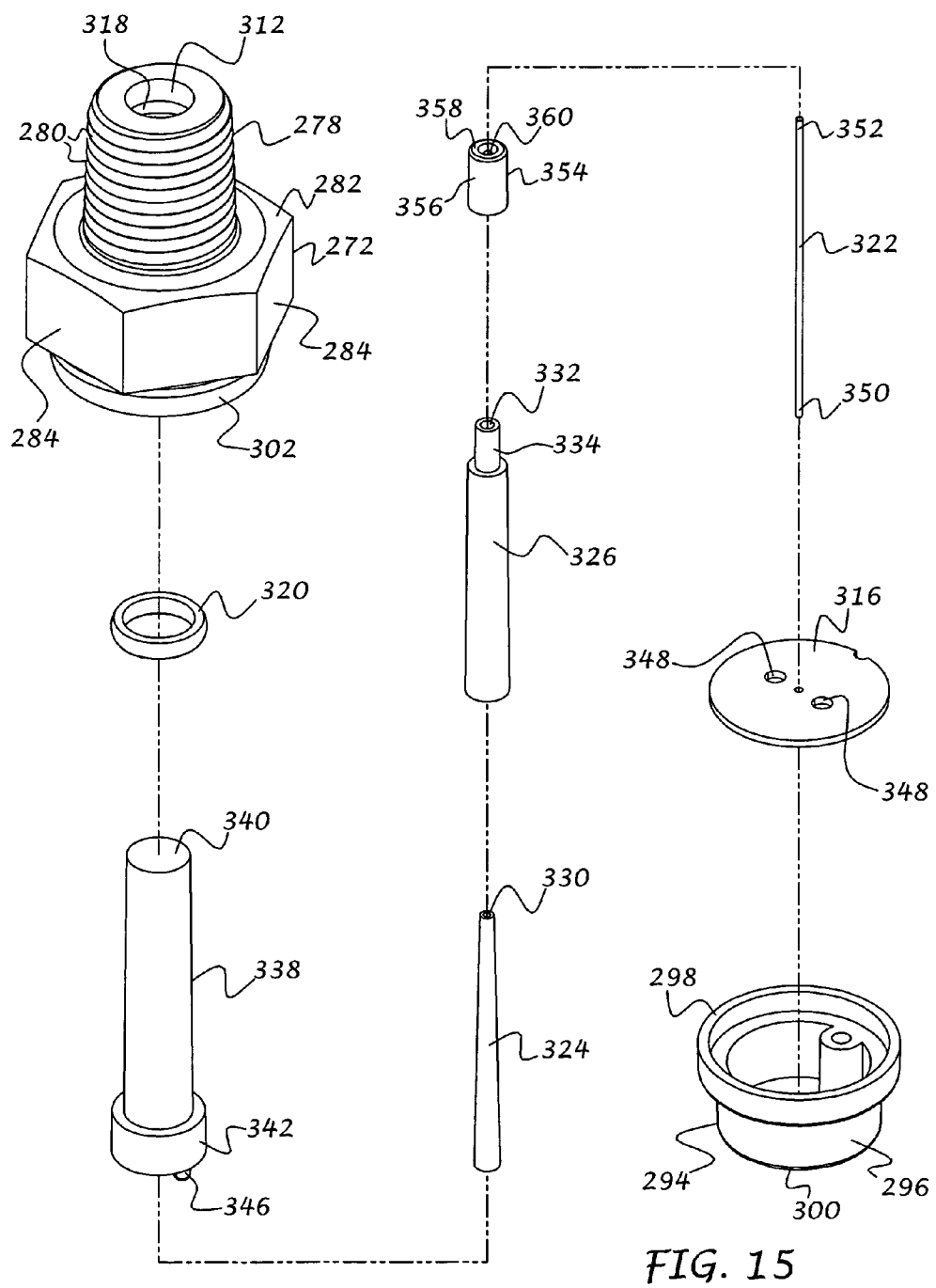
FIG. 15 is a bottom exploded isometric view thereof.
Figure 16:
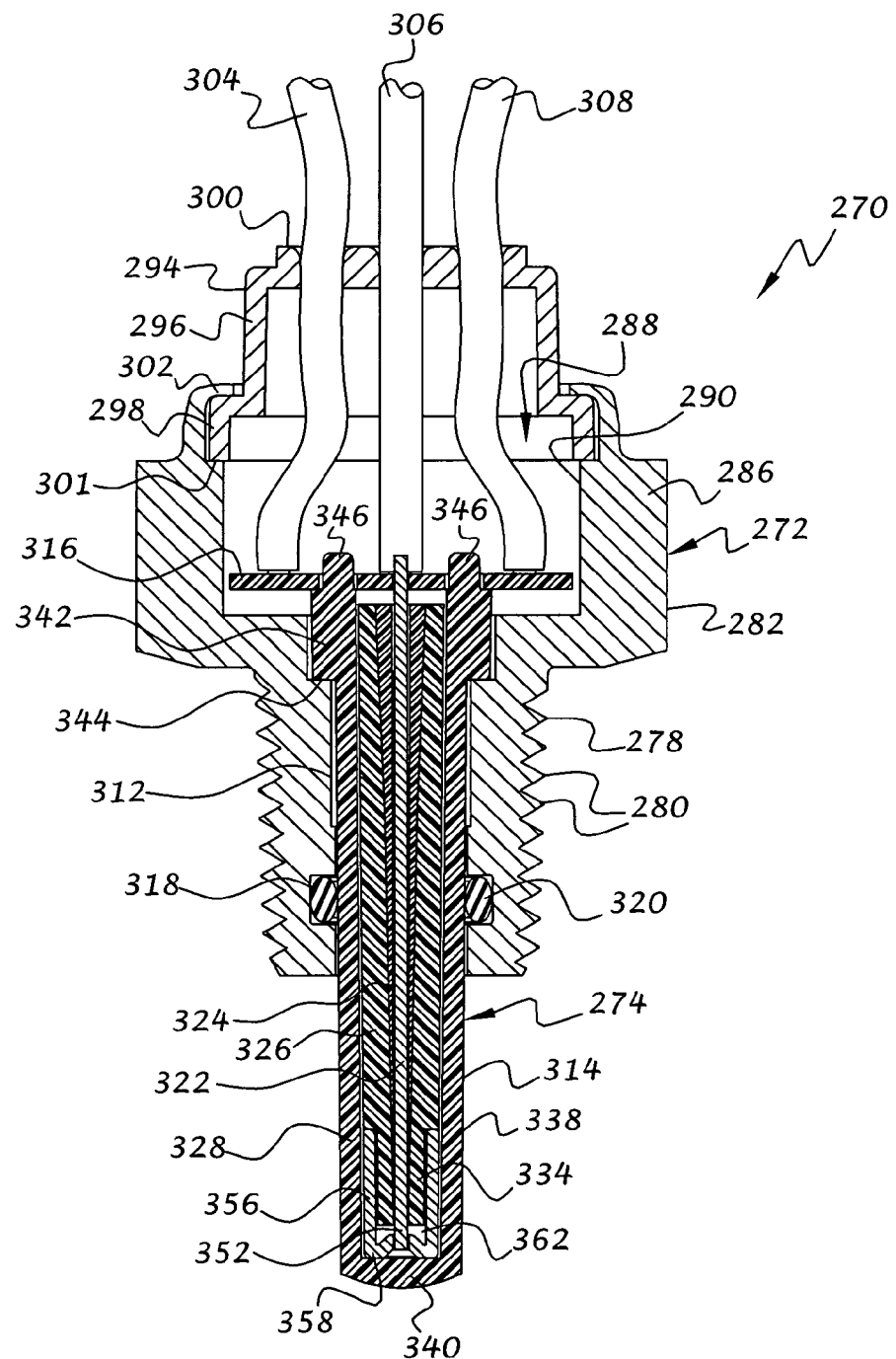
FIG. 16 is a longitudinal sectional view of the sensor assembly of FIG. 12.

With additional reference to FIGS. 14-16, the securing section 282 has a wall 286 with the external faces 284 formed thereon and a generally cylindrical interior cavity 288 delimited by an interior surface 290 of the wall. An annular step 301 is formed in the interior surface 290 for supporting an end cap 294.

The end cap 294 has an annular side wall portion 296 with an enlarged wall section 298 and an upper wall 300. The enlarged wall section 298 is preferably supported on the annular step 301 of the mounting head 272. An annular flange 302 of the wall 286 can be pressed, rolled or otherwise deformed over the enlarged wall section 298 to secure the end cap 294 to the securing section 282. It will be understood that other means for holding the components together can be employed, such as adhesive, welding, heat staking, and so on. Electrical wires 304, 306 and 308 from the capacitive transducer 274 exit the mounting head 272 through openings 310 formed in the upper wall 300 of the end cap 294. The electrical wires preferably provide electrical power to the capacitive transducer 274 and send a liquid level signal to a display or other control circuitry (not shown). For example, the wires 304 and 306 may conduct power and ground, respectively, while the wire 308 may conduct the liquid level signal. It will be further understood that the end cap 294 can be replaced with encapsulating material and/or any other arrangement to isolate the electronics from the outside environment.

In accordance with a further embodiment of the invention, the wires and/or end cap may be replaced with a male or female plug portion with electrical connectors (not shown) for mating with a female or male plug portion (not shown), respectively, of the vehicle or system on which the liquid level sensor assembly 270 is to be installed.

A bore 312 is formed in the mounting section 278 of the mounting head 272. An elongate antenna probe 314, which forms part of the transducer 274, extends through the bore and terminates at a PCB 316. An annular channel 318 surrounds the bore 312. An O-ring is installed in the channel 18 for sealing the antenna probe 314 with the mounting head 272 to thereby create a pass-through connection for the antenna probe.

The PCB 316 preferably includes electronic circuitry similar to the electronics section 12 previously described for receiving signals from the antenna probe 314. However, it will be understood that the PCB 316 may contain other electronic circuitry for processing signals from the antenna probe 314.

The antenna probe 314 preferably includes a single electrical trace portion 322 surrounded by an electrically insulating inner sleeve 324, a center sleeve 326 and an outer sheath 328. The inner sleeve 324 is preferably conical in shape and includes a central bore 330 through which the electrical trace portion 322 extends. The center sleeve 326 is preferably generally cylindrical in shape and includes a conically-shaped bore 332 for receiving the inner sleeve 324. A reduced diameter portion 334 is formed at a lower end of the center sleeve 326. The outer sheath 328 is preferably generally cylindrical in shape and includes a cylindrically-shaped bore 336 for receiving the center sleeve 326. The outer sheath 328 also includes an annular side wall 338 and an end wall 340 to encapsulate the center and inner sleeves as well as the portion of the trace portion 322 that would otherwise be exposed to the liquid being measured. An enlarged diameter portion 342 is formed at an upper end of the outer sheath 328. When assembled, the enlarged portion 342 seats on an internal shoulder 344 of the mounting section 278. A pair of nubs 346 project upwardly from the enlarged portion 342 and are located within openings 348 formed in the PCB 316. The inner and center sleeves as well as the outer sheath can be constructed of any known insulating material such as elastomers, plastics, ceramics, composites, and so on. In environments where foreign materials may tend to adhere to the outer sheath 328, it can be constructed of a material or coating with a low coefficient of friction, such as Teflon™, Tefzel™ or other fluorinated material.

The trace portion 322 is preferably in the form of a single electrically conductive wire, such as copper or aluminum, with an upper or proximal end 350 electrically connected to the PCB 316 and a lower end 352 electrically connected to an enlarged measurement portion 354. In accordance with a further embodiment of the invention, the trace portion 322 is preferably in the form of a flexible, multi-stranded conductive cable that terminates at the PCB 316. The enlarged measurement portion 354 is preferably constructed of an electrically conductive material, such as copper, aluminum or brass, and formed into a cup-shaped configuration with a continuous side wall 356 extending upwardly from a bottom wall 358 to form a hollow interior 362 which in turn is received over the reduced portion 334 of the center sleeve 326. An opening 360 is formed in the bottom wall 358 for receiving the lower end 352 of the trace portion 322. The enlarged cup-shaped measurement portion 354 can be electrically connected to the trace portion 322 through any well-known connection means such as soldering, crimping, bonding with conductive adhesive, and so on. The enlarged cup-shaped measurement portion 354 is preferably much greater in size or surface area than the trace portion 322 over an equivalent height to ensure a wide measurement bandwidth for a particular level condition to thereby minimize or eliminate the need to calibrate the capacitive transducer for different liquids or other fluent materials, as well as environmental factors such as temperature, humidity, fluid type, and so on. In order to obtain an even greater bandwidth, the center sheath 326 can also be constructed of an electrically conductive material and electrically connected to the enlarged measurement portion to thereby increase the measurement surface area.

It will be understood that the inner and middle sleeves, and/or the outer sheath may be replaced with one or more insulating layers that are overmolded or otherwise formed on the trace portion 322 and enlarged measurement portion 354.

The above-described arrangement is especially suitable for measuring liquid level in high pressure and/or low temperature environments, such as propane tanks, cryogenic tanks, and so on, as well as low pressure and or highly volatile environments since the measurement electronics are completely isolated from the liquid being measured. In addition, the pass-through connection arrangement for the antenna probe 314 eliminates the need for specialized connectors when it becomes necessary to seal the contents of the tank from the electronics, thereby reducing manufacturing costs of the liquid level sensor assembly 270.

It will be understood that the antenna probe 270 is not limited to a single electrical conductor 226 but can be provided with multiple electrically isolated conductors.

In accordance with a further embodiment of the invention, the antenna probe 314 can be replaced with one or more of the embodiments of FIGS. 6-11 to give discrete measurement points for detecting multiple discrete levels and/or continuous level with discrete calibration points, detection of different liquids and/or vapors at different heights, and so on, as well as compensation for ambient conditions and other environmental factors.

Figure 17:
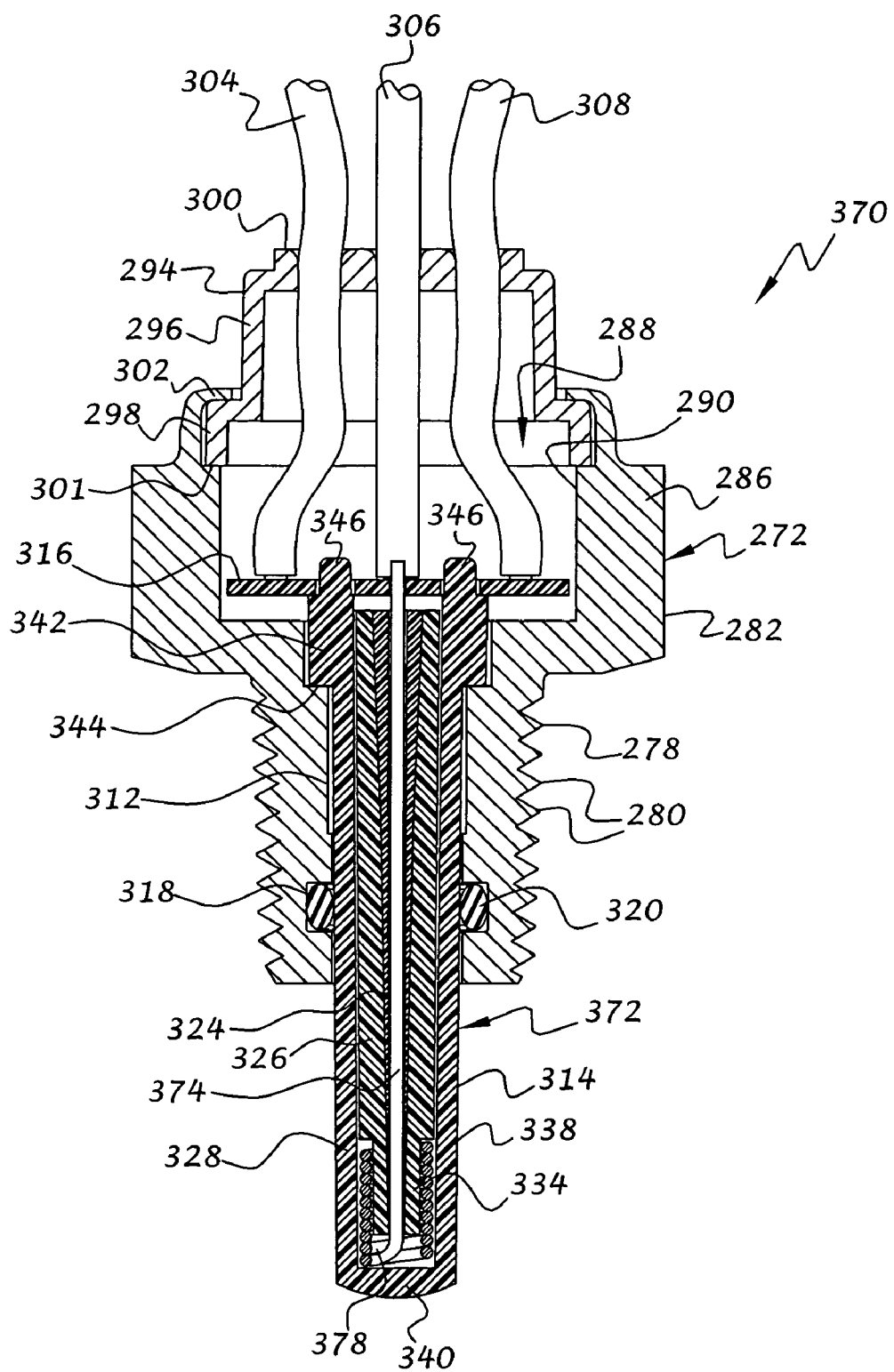
FIG. 17 is a longitudinal sectional view of a capacitive liquid level sensor assembly in accordance with a further embodiment of the invention.

Referring now to FIG. 17, a capacitive liquid level sensor assembly 370 for measuring discrete liquid level in accordance with a further embodiment of the invention is illustrated. The sensor assembly 370 is similar in construction to the sensor assembly 270 previously described, with the exception that the capacitive transducer 372 includes a trace portion 374 with an integrally formed enlarged measurement portion 376 in the form of an electrically conductive spring or coil 378 that extends over the reduced portion 334 of the center sheath 326. The coil 378 effectively increases the measuring surface area of the transducer 372 for greater bandwidth, as previously described. As in the previous embodiment, the center sheath 326 may also be constructed of electrically conductive material and in electrical contact with the coil 378 in order to further increase the measurement surface area. It will be understood that the coil 378 may be separately formed and electrically connected to the trace portion 374 through any well-known connection means.

In each of the above-described embodiments, it is not necessary to provide a second conductive plate as the material being measured functions as such. Accordingly, the antenna probes of the present invention are capable of measuring both discrete and continuous level of liquids and other fluent material with a single conductive element, the measurement of which is enhanced by the provision of a capacitive transducer with an enlarged measurement portion.

It will be understood that the term "preferably" as used throughout the specification refers to one or more exemplary embodiments of the invention and therefore is not to be interpreted in any limiting sense. It will be further understood that the term "connect" and its various derivatives as may be used throughout the specification refer to components that may be joined together either directly or through one or more intermediate members. In addition, terms of orientation and/or position as may be used throughout the specification relate to relative rather than absolute orientations and/or positions.

It will be appreciated by those skilled in the art that changes could be made to the embodiments described above without departing from the broad inventive concept thereof. By way of example, the enlarged measurement portion can be located at any position along the conductive trace portion or other electrical conductor. It will be understood, therefore, that this invention is not limited to the particular embodiments disclosed, but is intended to cover modifications within the spirit and scope of the present invention as defined by the appended claims.

We claim:

1. A capacitive sensor assembly for measuring a level of fluent material in a container, the capacitive sensor assembly comprising:
   electrical circuitry for receiving and processing signals; and
   an antenna probe having:
      an electrical conductor connected to the electrical circuitry;
      an enlarged measurement portion comprising a coiled portion connected to the electrical conductor for detecting the presence or absence of the fluent material, the enlarged measurement portion having a surface area that is larger than a surface area of the electrical conductor over an equivalent height to thereby function as a first plate of the capacitive sensor assembly, with the fluent material to be measured functioning as a second capacitive plate; and
      an insulating layer covering at least a portion of the electrical conductor and the enlarged measurement portion to thereby electrically isolate the electrical conductor and the enlarged measurement portion from the fluent material to be measured;
   wherein a change in detected capacitance of the antenna probe is reflective of a level condition of the fluent material.

2. A capacitive sensor assembly according to claim 1, wherein the enlarged measurement portion is located at a distal end portion of the electrical conductor.

3. A capacitive sensor assembly according to claim 1, wherein the enlarged measurement portion is spaced from a distal end portion of the electrical conductor.

4. A capacitive sensor assembly according to claim 1, wherein the insulating layer comprises a printed circuit board and the electrical conductor comprises a trace formed on the printed circuit board.

5. A capacitive sensor assembly according to claim 1, wherein the insulating layer comprises an outer sheath that surrounds at least the coiled portion.

6. A capacitive sensor assembly according to claim 1, wherein the electrical conductor comprises an electrically conductive wire.

7. A capacitive sensor assembly according to claim 6, wherein the coiled portion is integrally formed with the electrically conductive wire.

8. A capacitive sensor assembly according to claim 7, and further comprising a sleeve that surrounds at least a portion of the electrically conductive wire.

9. A capacitive sensor assembly according to claim 8, wherein a distal portion of the sleeve is located within the coiled portion.

10. A capacitive sensor assembly according to claim 9, wherein the sleeve is constructed of an insulating material.

11. A capacitive sensor assembly according to claim 9, wherein the sleeve is constructed of an electrically conductive material and is in electrical contact with the coiled portion.

12. A capacitive sensor assembly for measuring a level of fluent material in a container, the capacitive sensor assembly comprising:
   electrical circuitry for receiving and processing signals; and
   an antenna probe having:
      an electrical conductor connected to the electrical circuitry;
      a coiled measurement portion connected to the electrical conductor operable as a first plate of the capacitive sensor assembly for detecting the presence or absence of the fluent material; and
      an insulating layer covering at least a portion of the coiled measurement portion to thereby electrically isolate the electrical conductor and the enlarged measurement portion from the fluent material to be measured;
   wherein a change in detected capacitance of the antenna probe is reflective of a level condition of the fluent material.

13. A capacitive sensor assembly according to claim 12, wherein the fluent material to be measured functions as a second capacitive plate.

14. A capacitive sensor assembly according to claim 12, wherein the coiled measurement portion has a surface area that is larger than a surface area of the electrical conductor over an equivalent height.

15. A capacitive sensor assembly according to claim 12, wherein the insulative layer covers at least a portion of the electrical conductor.

16. A capacitive sensor assembly according to claim 15, wherein the electrical conductor comprises an electrically conductive wire.

17. A capacitive sensor assembly according to claim 12, wherein the electrical conductor comprises an electrically conductive wire.

18. A capacitive sensor assembly according to claim 17, and further comprising a sleeve that surrounds at least a portion of the electrically conductive wire.

19. A capacitive sensor assembly according to claim 18, wherein the sleeve is constructed of an insulating material.

20. A capacitive sensor assembly according to claim 18, wherein the sleeve is constructed of an electrically conductive material and is in electrical contact with the coiled portion.

* * * * *